US005387460A

United States Patent [19]

Hirakata et al.

[11] Patent Number: 5,387,460

[45] Date of Patent: Feb. 7, 1995

[54] THERMAL PRINTING INK MEDIUM

[75] Inventors: Susumu Hirakata; Eiichi Akutsu; Toru Okamoto; Hiroh Soga; Shigehito Ando, all of Ebina, Japan

[73] Assignee: Fuji Xerox Co., Ltd., Tokyo, Japan

[21] Appl. No.: 959,438

[22] Filed: Oct. 13, 1992

[30] Foreign Application Priority Data

Oct. 17, 1991 [JP] Japan .................................. 3-298262

[51] Int. Cl.[6] ................................................ B32B 7/02

[52] U.S. Cl. .................................... 428/212; 428/195; 428/207; 428/213; 428/323; 428/411.1; 428/457; 428/458; 428/469; 428/472.2; 428/913; 428/914

[58] Field of Search .......................... 346/76 R, 135.1; 428/212, 913, 914, 207, 209, 195, 213, 323, 411.1, 457, 458, 469, 472.2

[56] References Cited

U.S. PATENT DOCUMENTS

| | | | |
|---|---|---|---|
| 4,699,533 | 10/1987 | Crowe et al. | 346/76 R |
| 4,897,669 | 1/1990 | Akutsu et al. | 346/76 R |
| 4,967,206 | 10/1990 | Akutsu et al. | 346/76 R |
| 5,045,382 | 9/1991 | Akutsu et al. | 428/216 |
| 5,187,002 | 2/1993 | Egashira et al. | 428/195 |

FOREIGN PATENT DOCUMENTS

| | | |
|---|---|---|
| 59-21790 | 5/1984 | Japan . |
| 63-191684 | 8/1988 | Japan . |

OTHER PUBLICATIONS

Gazo Densi Gakkaishi, vol. 11, No. 1, pp. 3–9 (1982).
Gazo Densi Gakkaishi, vol. 16, No. 2, pp. 84–88 (1987).
IBM J. Res. Develop., vol. 29, No. 5, pp. 519–526 (1985).

*Primary Examiner*—Marie R. Acholl
*Attorney, Agent, or Firm*—Oliff & Berridge

[57] ABSTRACT

A thermal printing ink medium which electrically generates heat to transfer an ink thereof to a transfer material to form an image thereon is disclosed, which comprises a first heating element layer, a second heating element layer in contact with said first heating element layer, said second heating element layer having a greater volume resistivity than said first heating element layer, a conductive layer in contact with said second heating element layer, an ink layer provided on the side of said conductive layer opposite to said second heating element layer, and an adhesion-improving layer formed on the interface between said conductive layer and second heating element layer by the interaction therebetween so as to have a given volume resistivity. The thermal printing ink medium has advantages of (1) broadened choice of materials for an ink layer and ease in coloring the ink layer, (2) production ease and economy, (3) stable printing quality, (4) feasibility of repeated use, (5) an increased energy efficiency in image printing, (6) freedom from surface damage, (7) a reduced peak temperature of heat generation in a heat generating layer, and (8) high resolving power.

16 Claims, 4 Drawing Sheets

THERMAL PRINTING INK MEDIUM

FIELD OF THE INVENTION

This invention relates to a thermal printing ink medium which electrically generates heat in accordance with image information and thereby transfers the ink-layer thereof to a transfer material to form an image.

BACKGROUND OF THE INVENTION

Known thermal printing ink media of this type include those shown in FIGS. 7 and 8, as described in *GAZO DENSI GAKKAISHI*, Vol. 11, No. 1, pp. 3–9 (1982) and *ibid*, Vol. 16, No. 2, pp. 84–88 (1987), respectively.

In FIG. 7, ink medium 100 is a composite plastic film composed of 15 to 25 μm thick layer 101 for current passage, 5 to 20 μm thick semiconductive layer 102, and 400 to 500 Å thick conductive layer 103. With a constant voltage (either AC or DC) applied to recording head 104, an electric current passes as indicated by the dotted line to induce a breakdown in the vicinity of the boundary between semiconductive layer 102 and conductive layer 103. Conductive layer 103 and a part of semiconductive layer 102 are thus transferred to transfer material 105 and simultaneously fixed thereon by the electrically generated heat to provide a semipermanent record.

In FIGS. 8-(*a*) and (*b*), ink medium 110 has a three-layered structure composed of base layer 111 for current passage, conductive layer 112, and ink layer 113 or a four-layered structure composed of base layer 111 for current passage, conductive layer 112, release layer 114, and ink layer 113. Ink medium 110 is characterized by providing a separate conductive layer independent on an ink layer. Electricity is applied from recording head 115 to conductive layer 112 via base layer 111 to cause base layer 111 to generate heat thereby to transfer the ink of ink layer 113 to transfer material 116.

Further, JP-A-63-191684 (the term "JP-A" as used herein means an "unexamined published Japanese patent application") proposes a process for producing a thermal printing ink medium shown in FIG. 9. In FIG. 9, thermal printing ink medium 120 comprises heat fusible ink layer 121, conductive layer 122, and resistive layer 123. Resistive layer 123 is composed of high resistive layer **123*a* which has an electrical resistance to electrically generate heat sufficient for melting the heat-fusible ink and low resistive layer 123*b* which has a lower electrical resistance than high resistive layer 123*a*, with low resistive layer 123*b* being on the side to be in contact with a recording electrode 124. The process proposed is characterized in that a coating composition containing a resin and a conductive material is spray-coated on high resistive layer 123*a* to a thickness of from 0.1 to 3 μm to form low resistive layer 123*b***.

The above-mentioned conventional techniques have their own disadvantages. In the case of ink medium 100, since the transferred image layer consists of conductive layer 103 and semiconductive layer 102, conductive layer 103 must have conductivity and a visual color. In order to render layer 103 conductive, carbon particles, etc. should be added thereto. This not only narrows choice of materials but makes coloring difficult. Further, since both layers 101 and 102 have an insufficient thickness for serving as a support for film formation, ink medium 100 cannot be produced without difficulty in laminating of thin films and without an increase in the cost of production. Furthermore, since image signals return through conductive layer 103, which also serves as an ink layer, printing unavoidably results in a structural change to lose conductive layer 103, which is an essential constituent of the ink medium. This causes instable printing quality. Besides, it is difficult to regenerate the lost part of conductive layer 103, making it difficult to repeatedly use the ink medium.

In the case of ink medium 110, since base layer 111, which plays the main role in heat generation, is remote from ink layer 113, the heat generated in base layer 111 is dissipated till it reaches ink layer 113, resulting in a low energy efficiency. Further, since electricity from recording head 115 is passed directly to base layer 111, the main part for heat generation, the surface of base layer 111 has large heat generation energy due to the contact resistance with recording head 115, resulting in damage of the surface of base layer 111. Furthermore, since conductive layer 112 contacts with ink layer 113 either directly or via release layer 114, it is liable to be damaged. As a result, the printing tends to be instable. Besides, regeneration of the damaged conductive layer 112 is difficult, making it difficult to repeatedly use the ink medium.

In the case of ink medium 120, the contact resistance between the medium and recording head 125 may be reduced by providing low resistive layer **123*b*. However, since low resistive layer 123*b* is very thin, and, as a result, high resistive layer 123*b* is necessarily fairly thick, the heat generated in high resistive layer 123*a* is dissipated while passing therethrough till it reaches ink layer 121. Therefore, an improvement in energy efficiency cannot be expected. It is necessary to set the peak temperature of heat generation in high resistive layer 123*a* at a high value before the reduction in energy efficiency accompanied by heat dissipation in high resistive layer 123*a* can be compensated for, but this gives rise to another problem of an increase in requisite energy. Further, the diffusion of the heat in high resistive layer 123*a* results in undesired widening of the area of ink layer 121 to be melted and transferred, i.e., a reduction in resolving power. Furthermore, when ink layer 121 is transferred, conductive layer 122 in direct contact therewith is liable to be damaged, and stable printing is hardly obtained. It is difficult to regenerate the damaged part of conductive layer 122**, making it difficult to repeatedly use the ink medium.

SUMMARY OF THE INVENTION

An object of the present invention is to provide a thermal printing ink medium which can be produced with broadened choice of materials for an ink layer and with ease of coloring the ink layer, which can be produced with ease and at low cost, which provides stable printing quality, which can be repeatedly used, which has an increased energy efficiency in image printing, which is free from surface damage, which has a reduced peak temperature of heat generation in a heat generating layer, and which achieves printing with a high resolving power.

The present invention relates to a thermal printing ink medium which electrically generates heat to transfer an ink thereof to a transfer material to form an image thereon, which comprises a first heating element layer, a second heating element layer in contact with said first heating element layer, said second heating element layer having a greater volume resistivity than said first heating element layer, a conductive layer in contact with said second heating element layer, an ink layer provided on the side of said conductive layer opposite to said second heating element layer, and an adhesion-improving layer formed on the interface between said conductive layer and second heating element layer by the interaction therebetween so as to have a given volume resistivity.

DETAILED DESCRIPTION OF THE INVENTION

Figure 1:
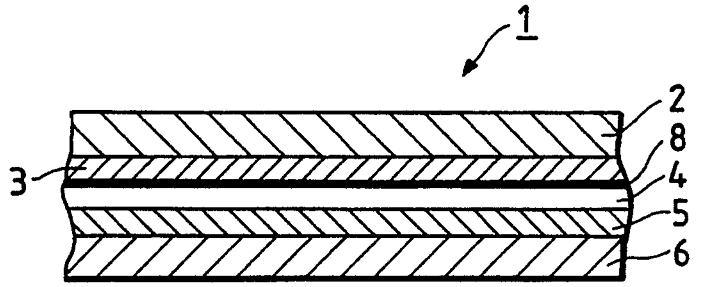
FIGS. 1 and 2 both illustrate a cross section of the thermal printing ink medium according to the present invention.

The thermal printing ink medium according to the present invention will be explained by referring to FIGS. 1 or 2. First heating element layer 2 chiefly functions as a conductive path for an electric current of image signals and as a support of ink medium 1 but not as a main heating element. First heating element layer preferably has a volume resistivity ranging from $10^{-2}$ to $10^4$ Ωcm, and more preferably from $10^{-1}$ to $10^2$ Ωcm, and a thickness ranging from 500 Å to 200 μm, and more preferably from 5 to 50 μm. First heating element layer is required to have a heat resistance of at least 200° C., and preferably 300° C. or higher. The terminology "heat resistance" as used herein means a temperature range in which a change in electrical resistance is within 10% and no appreciable change in shape is caused.

First heating element layer 2 comprises a heat-resistant binder resin having dispersed or dissolved therein a conductive material. Examples of suitable binder resins are polyimide resins, aromatic polyamide resins, polysulfone resins, polyimide-amide resins, polyester-imide resins, polyphenylene oxide resins, poly-p-xylylene resins, polybenzimidazole resins, and derivatives thereof. Examples of suitable conductive materials include carbon particles, metal powders, conductive ceramics powders, and ion conducting materials, such as charge transfer complexes. These materials should be so selected as to have the above-recited volume resistivity. Where an anisotropic conductive layer is provided on the surface of first heating element layer 2 as hereinafter described, the first heating element layer may be a conductive ceramic layer, a mixed layer of an insulating ceramic material and a conductive ceramic material, or a calcined conductive paste layer.

Second heating element layer 3 is a characteristic part of thermal printing ink medium 1, which is a main part serving for converting electricity energy to heat energy for thermal printing. The amount of heat generated in second heating element layer 3 depends on its thickness and resistivity, making great influences on printing.

First heating element layer 2 and second heating element layer 3 preferably satisfy the following relationships:

$$R_2 \geqq 2R_1 \text{ and } T_2 < T_1$$

wherein $R_1$ is a volume resistivity of the first heating element layer; $R_2$ is a volume resistivity of the second heating element layer; $T_1$ is a thickness of the first heating element layer; and $T_2$ is a thickness of the second heating element layer.

If $R_2 < 2R_1$, the proportion of the heat generated in first heating element layer 2 in the total heat generated becomes too large. It follows that the printing energy efficiency decreases and the contact resistance with a printing head increases, resulting in a tendency to instable printing. If $T_2 \geqq T_1$, the main part for heat generation is remote from ink layer 6 so that the heat generated in second heating element layer 3 is diffused until it reaches ink layer 6, resulting in a reduction in resolving power and an insubstantial increase in printing energy efficiency.

Second heating element layer 3 preferably has a volume resistivity ranging from $10^{-1}$ to $10^{10}$ Ωcm, and more preferably from $10^0$ to $10^4$ Ωcm, and a thickness of from 500 Å to 200 μm, and more preferably from 0.1 to 9 μm. Second heating element layer 3 preferably has a heat resistance of 250° C. or higher. Second heating element layer 3 include a single, mixed, or composite layer of various ceramic materials, a mixed or composite layer of a heat-resistant resin and one or more conductive or insulating fillers, and a mixed or composite layer of various ceramic materials and metallic materials.

Examples of suitable conductive fillers or conductive materials include single substances, e.g., C, Ni, Au, Ag, Fe, Al, Ti, Pd, Ta, Cu, Co, Cr, Pt, Mo, Ru, Rh, W, In, etc.; and compounds, e.g., $VO_2$, $Ru_2O$, TaN, SiC, $ZrO_2$, InO, $Ta_2N$, ZrN, NbN, VN, $TiB_2$, $ZrB_2$, $HfB_2$, $TaB_2$, $MoB_2$, $CrB_2$, $B_4C$, MoB, ZrC, VC, TiC, etc.

Insulating materials to be used for binding of the above-described conductive materials or for resistivity control of the whole second heating element layer 3 include ceramics, e.g., AlN, $SiN_4$, $Al_2O_3$, MgO, $VO_2$, $SiO_2$, $ZrO_2$, $MO_2$, $Bi_2O_3$, $TiO_2$, $MoO_2$, $WO_2$, $VO_2$, $NbO_2$, $BO_6$, and $ReO_3$, and the heat-resistant resins as illustrated for first heating element layer 2.

Adhesion-improving layer 8 is a layer mainly comprising a metal oxide which is formed on the interface between second heating element layer 3 and conductive layer 4 as a result of oxidation or calcination of these two layers. Adhesion-improving layer 8 preferably has a volume resistivity of from $10^{-1}$ to $10^{10}$ Ωcm and a thickness of not more than 0.3 μm, and particularly not more than 0.05 μm, while varying depending on the materials forming conductive layer 4 and second heating element layer 3, and the temperature of bonding second heating element layer 3 and conductive layer 4. The lower limit of the thickness of adhesion-improving layer is preferably 100 Å. The main function of adhesion-improving layer 8 is to improve adhesion between second heating element layer 3 and conductive layer 4.

While adhesion-improving layer 8 is considered to function as a third heating element layer because of its resistivity, the main part taking the function of heat generation is still second heating element layer 3 because the actually measured resistivity of layer 8 is considerably lower than the substantial resistivity thereof due to a tunnel effect of its very small thickness. It is believed, anyway, that adhesion-improving layer 8 makes some contribution to heat generation to increase the printing energy efficiency.

Adhesion-improving layer 8 brings about great improvement in adhesion between second heating element layer 3 and conductive layer 4 so that delamination or cracking arising from physical strains of the heating element layer and conductive layer due to sudden heat generation at printing can be prevented. Further, the existence of adhesion-improving layer 8 prevents local heat generation at the interface between second heating element layer 3 and conductive layer 4 so that the resulting heat generation condition is free from thermal stress and with good reproduction of the heat generation profile. Furthermore, since adhesion-improving layer 8 makes the heat generating interface uniform, concentration of the current path at printing can be minimized to reduce the damage of the ink medium. As a result, the time of repeated use, i.e., durability of the ink medium can be increased.

Conductive layer 4 is a conducting path functioning to diffuse and reflux the electric current from first and second heating element layers 2 and 3 and adhesion-improving layer 8. Conductive layer 4 is formed of a metallic or conductive ceramic material having a volume resistivity of not more than $10^{-2}$ Ωcm by vacuum evaporation, sputtering, coating, or the like film forming technique. Conductive layer 4 usually has a thickness of from 500 Å to 3 μm, and preferably from 1000 Å to 3000 Å. If its thickness exceeds 3 μm, the heat generation energy of the heating element layer tends to be leaked to reduce the energy efficiency. If it is less than 500 Å, the functions as a conducting path are liable to variation.

Ink layer 6 comprises a thermoplastic resin having a melting point or sublimation point of not more than 150° C. containing a colorant or it comprises a dye whose thermal decomposition point is different from its sublimation point. Ink layer 6 preferably has a thickness of from 0.1 to 10 μm.

If desired, protective layer 5 may be provided between conductive layer 4 and ink layer 6. While having for its primary function the protection of conductive layer 4, protective layer 5 also aims at the control of the surface energy on the ink layer side, physical uniformity (e.g., smoothness) of the surface in contact with ink layer 6, or prevention of leakage of current. Protective layer 5 has a thickness usually of from 0.1 to 4.9 μm, and preferably of from 0.5 to 2.5 μm. From the standpoint of electrical blocking, such as prevention of leakage of current, protective layer 5 preferably has a volume resistivity of at least $10^{8}$ Ωcm. From the standpoint of ink transfer performance, protective layer 5 preferably has a critical surface tension of not more than 36 dyne/cm. If the thickness of protective layer 5 is too small, the effect of improving printing stability is small. If it is greater than 4.9 μm, the printing energy increases. If the critical surface tension is too high, the sharpness of printing dots is reduced.

Examples of suitable materials of protective layer 5 include fluorine resins, silicone resins, polyimide resins, aromatic polyamide resins, polyamide resins, epoxy resins, and mixtures thereof.

Figure 2:
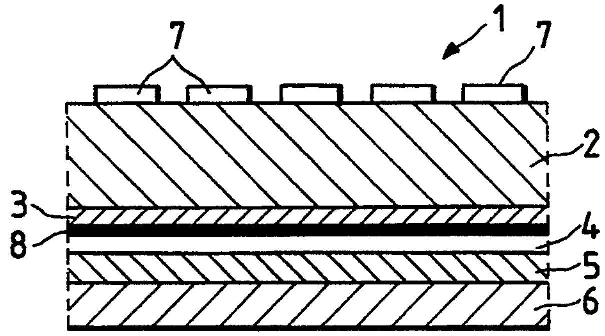

If desired, anisotropic conductive layer 7 may be provided on the surface of first heating element layer 2 as shown in FIG. 2. Anisotropic conductive layer 7 has an electrical resistance in the thickness direction no higher than 1/5 that in the longitudinal direction and a heat resistance of at least 200° C. The thickness of anisotropic conductive layer 7 preferably ranges from 500 Å to 100 μm.

Figure 3:
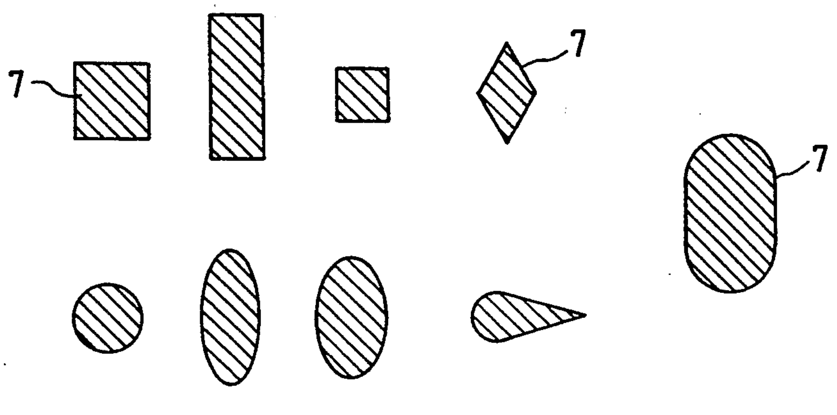
FIG. 3 schematically shows shapes of an anisotropic conductive layer which may be formed on the surface of the thermal printing ink medium according to the present invention.

Anisotropic conductive layer 7 comprises small diameter columns having conductivity arrayed on the surface of the heat-resistant insulating resin at prescribed intervals with the gaps among the columns left vacant or filled with an insulating material. The contour of conductive layer 7 may have a circular shape or a tile shape as shown in FIG. 3.

Printing recording with the thermal printing ink medium of the present invention can be carried out as follows.

Figure 4:
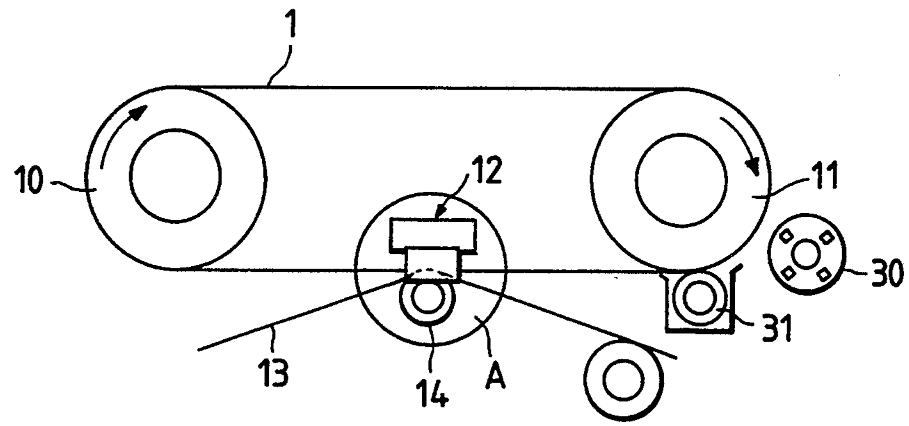
FIG. 4 schematically illustrates a thermal printing apparatus to which the thermal printing ink medium of the present invention is applied.

FIG. 4 illustrates a printing apparatus for carrying out thermal printing using the ink medium of the present invention. Thermal printing ink medium 1 having an endless belt form is put on a pair of rolls, driving roll 10 and follower roll 11. Printing head 12 is set in contact with the center of the lower horizontally held belt of ink medium 1 under pressure. On the reverse side of ink medium 1 in contact with printing head 12, platen roll 14 is set for carrying transfer paper 13 in contact with ink medium 1.

Ink medium 1, while being carried by driving roll 10 and follower roll 11 to the direction indicated by the arrow, comes into contact with transfer paper 13 between printing head 12 and platen roll 14. At this contact point the ink layer of ink medium 1 is heated and transferred onto transfer paper 13. Transfer paper 13 is then separated apart from ink medium 1 to complete image formation.

Figure 5:
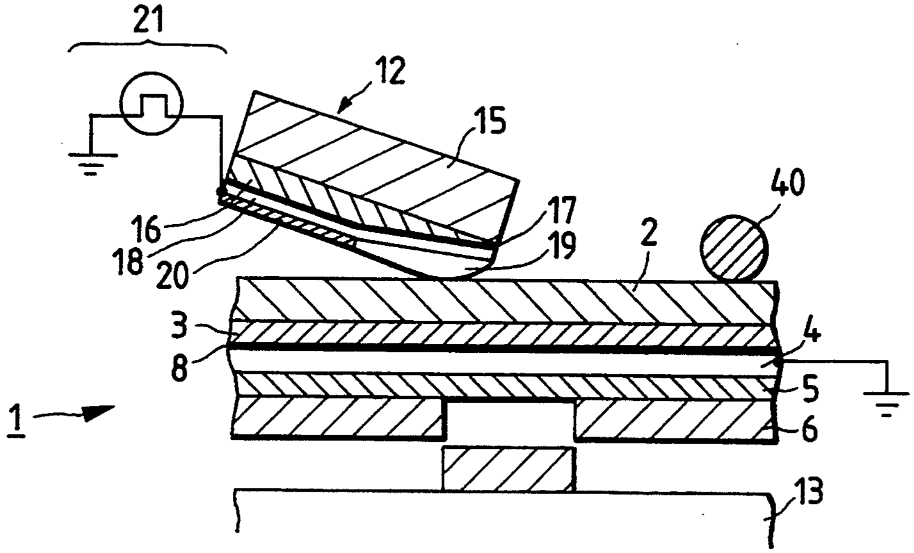
FIGS. 5 and 6 each shows the printing mechanism of the thermal printing ink medium according to the present invention.
Figure 6:
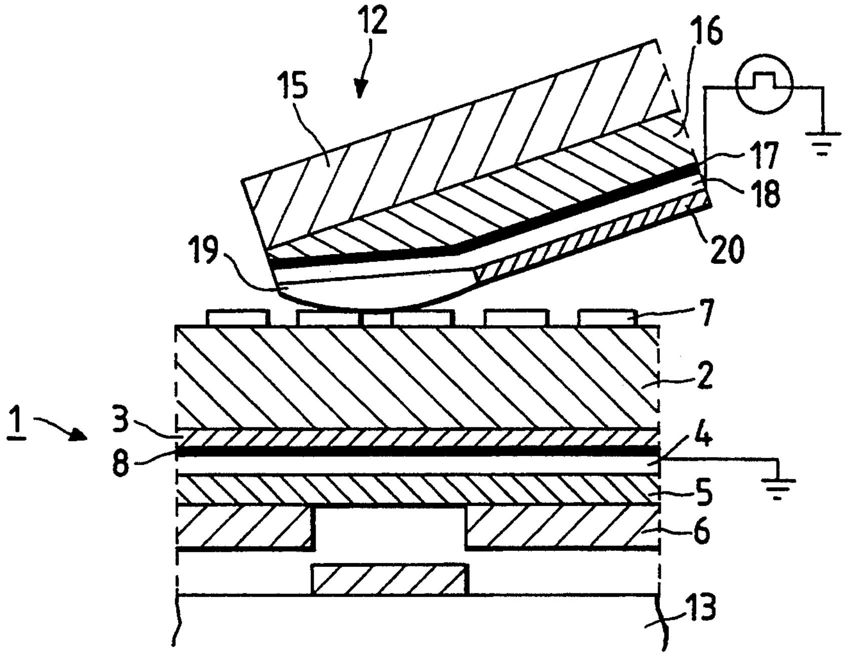
Figure 7:
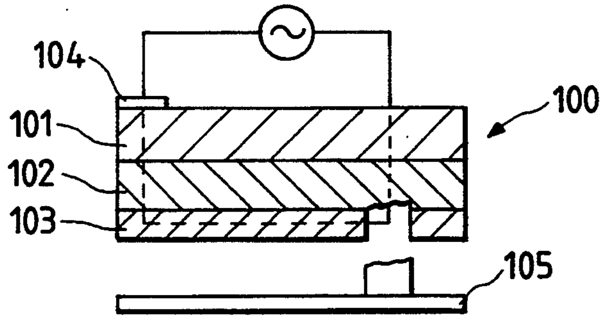
FIG. 7 is a cross section of a conventional thermal printing ink medium.
Figure 9:
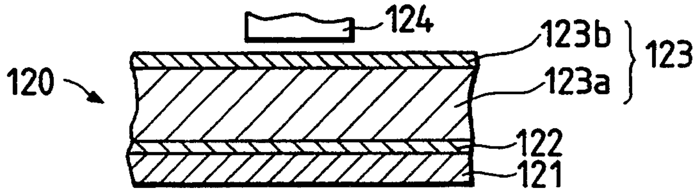
FIG. 9 is a cross section of a still another conventional thermal printing ink medium.
Figure 8A:
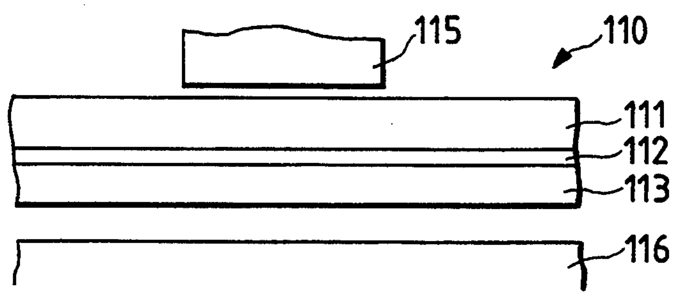
FIG. 8 is a cross section of another conventional thermal printing ink medium.
Figure 8B:
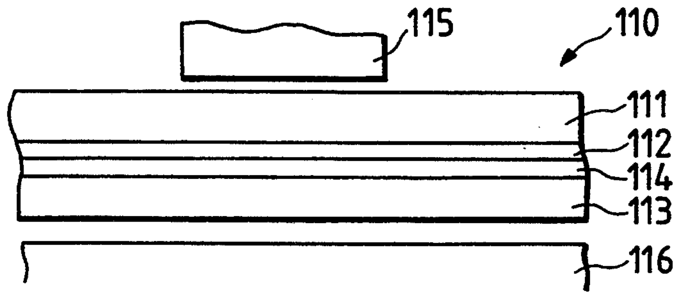

The printing mechanism will be explained in more detail by referring to FIGS. 5 and 6 each illustrating the printing part A of FIG. 4. Printing head 12 is composed of base 15, elastic body layer 16, insulating support layer 17, a plurality of linear electrodes 18 for current passage which are arranged on insulating support layer 17 at given intervals, a plurality of square recording electrodes formed at the tip of each linear. electrode 18, and insulating coat 20 covering each linear electrode 18.

Recording electrodes 19 are each formed at a pitch corresponding to individual printing pixels. Each recording electrode 19 is connected to pulse driving circuit 21 via linear electrode 18. With printing head 12 contacting under pressure with first heating element layer 2 or anisotropic conductive layer 7, signal electrical pulses are sent from recording electrodes 19 to ink medium 1 in accordance with image information to be recorded. The pulse current passes through first heating element layer 2, second heating element layer 3, adhesion-improving layer 8, and conductive layer 4 in this order and reaches to a ground. Meanwhile, electric heat is generated in the first and second heating element layers 2, 3 and adhesion-improving layer 8. The amount of heat generated in each of these layers is decided by the respective resistivity. Because the resistivity of first heating element layer 2 is smaller than that of second heating element layer 3 and also because the actually measured resistivity of adhesion-improving layer 8 is low as mentioned above, heat generation mainly owes to second heating element layer 3. Sandwiched between second heating element layer 2 and conductive layer 4, second heating element layer 3 is in static contact with each of these layer without direct contact with printing head 12. Further, second heating element layer 3 as a main heat generating region is relatively close to ink layer 6. Therefore, a contact loss on electricity application and unevenness in heat generation hardly occur. Moreover, since the energy efficiency is high owing to the closeness to ink layer 6, the requisite electrical power can be so decreased, thus protecting ink medium 1 from damage. In FIG. 5, numeral 40 indicates a wire electrode acting as a return path for the current having passed through conductive layer 4.

Thus, the thermal printing ink medium according to the present invention could be repeatedly used with a unit for regenerating the ink layer being added.

The unit for ink layer regeneration which can be applied to the ink medium of the present invention comprises, as shown in FIG. 4, ink powder feed roll 30 and leveling roll 31 for leveling the surface of the ink powder layer supplied to the surface of ink medium 1.

The present invention is now illustrated in greater detail with reference to Examples shown in Figures, but it should be understood that the present invention is not construed as being limited thereto. All the percents are by weight unless otherwise indicated.

EXAMPLE 1

A 40 μm thick film having a volume resistivity of 1.5 Ωcm comprising a polyimide resin having dispersed therein carbon particles (first heating element layer 2) was coated with a polyimide resin having dispersed therein carbon particles followed by heat-curing to form a 3 μm thick layer having a volume resistivity of 60 Ωcm (second heating element layer 3). Aluminum was vacuum deposited on the entire surface of second heating element layer 3 under conditions of 150° C. in substrate temperature and $5\times10^{-6}$ Torr in degree of vacuum to a deposit thickness of 2000 Å. A 15% ethyl acetate solution of a ladder silicone resin was coated on the entire surface of the aluminum layer by roll coating, dried at 120° C. for 1 minute, and hardened at 300° C. for 30 minutes to form 1.5 μm thick protective layer 5 having a critical surface tension of 34 dyne/cm and a volume resistivity of $5\times10^{14}$ Ωcm. A polyester resin having a melting point of 95° C. containing 9% of a copper phthalocyanine pigment was dissolved in toluene in a concentration of 15%, and the resulting ink solution was coated on protective layer 5 by wire bar coating and dried at 110° C. to form 5 μm thick ink layer 6.

Thermal printing ink medium 1 thus produced was cut with a microtome, and the cut area was analyzed by observation under a scanning electron microscope and by Auger analysis. It was confirmed that about 120 Å thick adhesion-improving layer 8 mainly comprising aluminum oxide was formed between aluminum conductive layer 4 and second heating element layer 3. The adhesion-improving layer had an average volume resistivity of $10^4$ Ωcm. Since pure aluminum oxide has a volume resistivity higher than that of the adhesion-improving layer, it appears that the adhesion-improving layer comprises polyimide in addition to aluminum oxide, or pinhole or a tunnel effect due to thin film thickness contributes to the adhesion-improving layer.

The resulting ink medium was set in a thermal printing apparatus having the structure shown in FIG. 4 in which fixed printing head 12 was composed of 45 μm-square stylus electrodes 19 arrayed at a pitch of 62.5 μm to a width of 210 mm. Printing head 12 was brought into contact with first heating element layer 2 of ink medium 1 under a linear pressure of 120 g/cm while ink layer 6 of ink medium 1 being in contact with fine paper 13 which was supported by platen roll 14 comprising a SUS core covered with a 5 mm thick rubber layer having a rubber hardness of 60° according to JIS K-6301, the total roll diameter being 30 mm.

A pulse voltage of 13 V, 15 V or 17 V having a pulse width of 200 μs and a pulse period of 500 μs was applied to printing head 12 while moving transfer paper 13 and ink medium 1 at a linear velocity of 125 mm/sec to form a satisfactory dot image on transfer paper 13. The mean diameter of optional 100 dots and the standard deviation (σ), and typical dot shape are shown in Table 1 below.

TABLE 1

| | Applied Pulse Voltage | | |
|---|---|---|---|
| | 13 V | 15 V | 17 V |
| 100 Dot Mean Diameter (σ) | 57 μm (5 μm) | 72 μm (6 μm) | 98 μm (8 μm) |
| Dot Shape | rounded square | polygon-like circle | slightly oval dot |

As is apparent from Table 1, clear dots having a rounded 57 μm-square shape, though slightly greater than the size of the recording electrodes, were printed with a low applied voltage of 13 V. Further, variation of dot diameter is very small. As the applied voltage increased, the dot naturally increased its diameter but maintained a satisfactory shape.

EXAMPLE 2

A thermal printing ink medium was prepared in the same manner as in Example 1, except that anisotropic conductive layer 7 was formed on the surface of first heating element layer 2 as follows.

Tantalum nitride was deposited on the surface of first heating element layer 2 by radiofrequency sputtering to a thickness of 4000 Å. A photoresist film was formed on the tantalum nitride layer, exposed to light through a mask having 15 μm-square openings at a pitch of 20 μm throughout, and developed to form a resist pattern. After post-baking, the tantalum nitride layer on the area uncovered with the resist layer was removed by plasma etching in a vacuum chamber into which $CF_4$ and $O_2$ were introduced to a pressure of $2\times10^{-3}$ Torr. Finally, the resist pattern was removed to form 15 μm-square anisotropic conductive layers 7 at a pitch of 20 μm on the surface of first heating element layer 2.

The resulting ink medium 1 was subjected to the same printing test as in Example 1, except for changing the applied voltage to 9 V, 11 V, or 13 V. The results obtained are shown in Table 2 below.

TABLE 2

| | Applied Pulse Voltage | | |
|---|---|---|---|
| | 9 V | 11 V | 13 V |
| 100 Dot Mean Diameter (σ) | 53 μm (5 μm) | 79 μm (5 μm) | 108 μm (7 μm) |
| Dot Shape | square | rounded square | polygon-like circle |

It is seen from Table 2 that the existence of anisotropic conductive layer 7 on the surface of first heating element layer 2 makes it feasible to form a neat image made of clear 53 μm-square dots, though slightly greater than the size of the recording electrode, with a low applied voltage of 9 V, which is further lower than that used in Example 1. As the applied voltage increased, the dot naturally increased its diameter but maintained a satisfactory shape, such as a rounded square or a square-like circle. Further, variation of dot diameter is slightly improved.

COMPARATIVE EXAMPLE 1

An ink medium was prepared in the same manner as in Example 1, except that second heating element layer 3 was not formed and aluminum was vacuum deposited on the entire surface of first heating element layer 2 under the same condition.

Thermal printing ink medium 1 thus produced was cut with a microtome, and the cut area was analyzed by observation under a scanning electron microscope and by Auger analysis. It was confirmed that about 135 Å thick adhesion-improving layer mainly comprising aluminum oxide and having a volume resistivity of $10^4$ Ωcm was formed between aluminum conductive layer 4 and first heating element layer 2.

The resulting ink medium was subjected to the same printing test as in Example 1. The results obtained are shown in Table 3 below.

TABLE 3

| | Applied Pulse Voltage | | |
|---|---|---|---|
| | 13 V | 15 V | 17 V |
| 100 Dot Mean Diameter (σ) | blurred print | 42 μm (20 μm) | 51 μm (35 μm) |
| Dot Shape | — | star-like irregular dots | polygonal dots |

As is apparent from Table 3, an ink medium composed of a heating element layer having a single layer structure and an adhesion-improving layer hardly conducts printing with an applied voltage of 13 V. Printing was possible at an applied voltage of 15 V, but the printed dots had a small diameter of 42 μm and a star-like irregular shape. Even if the voltage was increased to 17 V, the printed dots still had a small diameter of 51 μm and a polygonal shape. Further, variation of dot diameter is very large.

On the other hand, by using this ink medium, ink powder was supplied for the regeneration of ink layer and thus printing was repeated. As a result, 10 or more repetition caused heat loss due to heat of the heating element layer and printing was impossible at 500 or more repetition.

EXAMPLE 3

A 30 μm thick polyimide resin film having dispersed therein carbon particles and having a volume resistivity of 2.5 Ωcm (first heating element layer 2) was coated with a low-temperature calcining type conductive paste, and the coated paste was calcined in a nitrogen atmosphere at 360° C. for 3 hours to form 2.2 μm thick second heating element layer 3 comprising a metal/ceramics mixture having a volume resistivity of $3\times10^2$ Ωcm. An Al layer was deposited on second heating element layer 3 by radiofrequency sputtering to a thickness of 2000 Å. Then, a 2.1 μm thick modified silicone resin film having a critical surface tension of 29 dyne/cm (protective layer 5) was formed thereon by solvent coating. Protective layer 5 had a volume resistivity of $10^{13}$ Ωcm or higher.

Thermal printing ink medium 1 thus produced was cut with a microtome, and the cut area was analyzed by observation under a scanning electron microscope and by Auger analysis. It was confirmed that about 100 Å thick adhesion-improving layer 8 mainly comprising aluminum oxide and having an average volume resistivity of $10^5$ Ωcm was formed between Al conductive layer 4 and second heating element layer 3.

A polyester resin having a melting point of 109° C. having dispersed therein 6% of a coloring pigment was ground to an average particle size of 16 μm by means of a jet mill. The resulting colored resin powder was electrically charged and adhered to protective layer 5 and heated to 130° C. to form ink layer 6 having an average thickness of 6.2 μm.

The resulting ink medium was subjected to the same printing test as in Example 1, except for changing the applied voltage to 10 V, 12 V or 14 V. The results obtained are shown in Table 4 below.

TABLE 4

| | Applied Pulse Voltage | | |
|---|---|---|---|
| | 10 V | 12 V | 14 V |
| 100 Dot Mean Diameter (σ) | 47 μm (8 μm) | 67 μm (8 μm) | 81 μm (7 μm) |
| Dot Shape | square dot with slight unevenness | square dot | rounded square dot |

As is apparent from Table 4, where ink layer 6 is made of a heat-fusible colored resin powder, 47 μm-square dots of almost the same size as the recording electrodes, though having a slightly uneven surface, can be clearly printed with a low voltage of 10 V, which is lower than that used in Example 1. As the applied voltage increases, the diameter of the dots naturally increases, but their shape is still superior to those obtained in Example 1.

EXAMPLE 4

A thermal printing ink medium was prepared in the same manner as in Example 3, except that anisotropic conductive layer 7 was formed on the surface of first heating element layer 2 as follows.

A thick resist-forming solution was coated on the surface of first heating element layer 2 and dried to form a photoresist. After drying, the photoresist was exposed to light through a mask having a pattern of polka dots of 25 μm in diameter at a pitch of 32.5 μm and developed to remove the resist film corresponding to the pattern. A conductive paste mainly comprising ethyl cellulose having dispersed therein fine particles of Ag, Pd, Ni, $Bi_2O_3$, and $SiO_2$ was screen printed thereon and calcined at 410° C. for 1.5 hours to form a calcined conductive paste film having a thickness of 8 μm in the areas where the resist film had been removed. Then, the calcined conductive paste film was removed to form anisotropic conductive layer 7 of a polka dots pattern having a volume resistivity of $4\times10^{-2}$ Ωcm.

The resulting ink medium was subjected to repetition of printing by use of the same printing apparatus as used in Example 1. The voltage applied to printing head 12 was 9 V. The ink layer from which the ink material had been transferred to transfer paper 13 was regenerated by supplying a charged ink powder. The results of printing are shown in Table 5 below.

TABLE 5

| | First Printing | 3000th Printing |
|---|---|---|
| Dot Diameter | 79 μm | 69 μm |
| Dot Shape | rounded square | rounded square |

It can be seen that the printed dots maintained the rounded square shape of the initial printing stage even after 3000 times repetition of printing while the dot size was slightly reduced from 79 μm to 69 μm. Namely, the ink medium according to the present invention was proved to sufficiently withstand repeated use.

EXAMPLE 5

An ink medium was prepared in the same manner as in Example 1 (volume resistivity of first heating element layer 2: 1.5 Ωcm), except for varying the amount of carbon particles to be dispersed in the polyimide resin forming second heating element layer 3 to form second heating element layer 3 having a volume resistivity of 1.2 Ωcm, 3 Ωcm, 10 Ωcm, or 150 Ωcm.

Each of the resulting ink media was found to have adhesion-improving layer 8 mainly comprising aluminum oxide between the conductive layer and the second heating element layer. These adhesion-improving layers had thickness of 120±10 Å and volume resistivity of $10^4$ Ωcm, irrespective of thickness of second heating element layer 3.

Each ink medium was set in the same thermal printing apparatus as used in Example 1, and the printing energy achieving a transfer ratio of 1, i.e., the printing energy required for transferring the entire ink coated to transfer paper was measured. The relationship of the printing energy per dot vs. volume resistivity is shown in FIG. 10.

Figure 10:
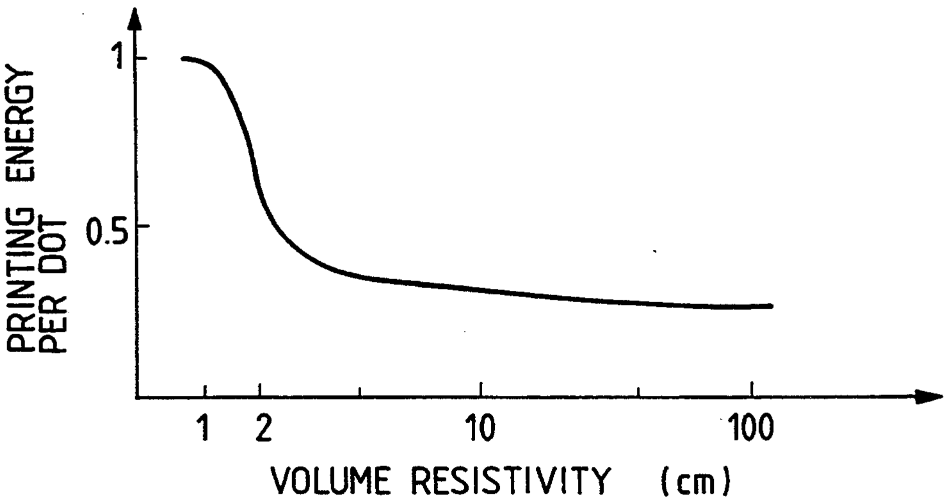
FIG. 10 is a graph of printing energy per dot vs. volume resistivity of the second heating element layer prepared in Example 5.

As is apparent from FIG. 10, the printing energy per dot is greatly reduced when the volume resistivity of the second heating element layer is 3 Ωcm or higher, i.e., when the volume resistivity of the second heating element layer is not less than twice that of the first heating element layer.

EXAMPLE 6

A thermal printing ink medium was prepared in the same manner as in Example 1 (thickness of first heating element layer 2: 40 μm), except for varying the thickness of second heating element layer 3 to 5 μm, 10 μm, 20 μm, 30 μm, 40 μm, or 50 μm while fixing its volume resistivity at 60 Ωcm.

Each of the resulting ink media was found to have adhesion-improving layer 8 mainly comprising aluminum oxide between the conductive layer and the second heating element layer. These adhesion-improving layers had thickness of 120 Å and volume resistivity of $10^4$ Ωcm, irrespective of thickness of second heating element layer 3.

Each of the resulting ink media was set in the same thermal printing apparatus as used in Example 1, and a line image (ladder image) was printed by switching "on" per 1 bit. The resulting ladder image is described in Table 6 below.

TABLE 6

| Thickness of 2nd Heating Element Layer (μm) | Line Image |
|---|---|
| 5 | sharp line with excellent resolving power |
| 10 | nearly sharp line with satisfactory resolving power |
| 20 | nearly sharp line with satisfactory resolving power |
| 30 | nearly sharp line with satisfactory resolving power |
| 40 | uneven line width, poor resolving power |
| 50 | failure to reproduction |

It can be seen that satisfactory printing quality can be obtained with the thickness of the second heating element layer being smaller than that of the first heating element layer.

COMPARATIVE EXAMPLE 2

A 0.1 μm thick cermet composed of SiO (60%) and Cr (40%) having a volume resistivity of 0.1 Ωcm as a second heating element layer was coated on a 5 μm thick stainless steel as a conductive layer, and then a 35 μm thick polyimide resin having dispersed therein carbon particles as a first heating element layer was coated on the second heating element layer, and hardened under pressure at 350° C. for 1 hour. Further, the ink layer prepared in Example 1 was coated on the conductive layer (opposite to the heating element layer side) to prepare a thermal printing ink medium.

Section of the heating element layers was observed by using an electron microscope. As a result, it was confirmed that no adhesion-improving layer was formed.

The resulting ink medium was subjected to the same printing test as in Example 1. The results obtained are shown in Table 7 below.

TABLE 7

| | Applied Pulse Voltage | | |
|---|---|---|---|
| | 13 V | 15 V | 17 V |
| 100 Dot Mean Diameter (σ) | blurred print | 42 μm (30 μm) | 51 μm (40 μm) |
| Dot Shape | — | star-like irregular dots | polygonal dots |

It is seen from Table 7 that variation of dot diameter is very large.

After printing test, section of the heating element layers was observed by using an electron microscope. As a result, it was confirmed that there were many cracks and delamination between the conductive layer and the second heating element layer.

On the other hand, by using this ink medium, ink powder was supplied for the regeneration of ink layer and thus printing was repeated. As a result, 10 or more repetition caused crack or delamination at the interface between the conductive layer and the second heating element layer and printing was impossible at 100 or more repetition. This indicates that an adhesion-improving layer brings about great improvement in adhesion between second heating element layer and conductive layer so that delamination or cracking arising from physical strains of the heating element layer and conductive layer due to sudden heat generation at printing can be reduced or prevented.

According to the present invention, since the ink layer does not need to serve the function as a conductive layer, the material for the ink layer can be chosen from a wide range, and it is easy to color the ink layer.

Since the first heating element layer has a low resistivity and therefore reduced responsibility as a resistive layer, it may have a relatively large thickness so as to serve as a substrate on which a plurality of layers may be successively formed to produce an ink medium. Therefore, the ink medium can be produced with ease at a reduced cost.

Where a protective layer is provided on the conductive layer, the conductive layer is protected against damage during the printing process. As a result, stable printing quality can be maintained, and the ink medium can be repeatedly used.

In the present invention, heat generation for printing mainly owes to the second heating element layer which has a greater volume resistivity than the first heating element layer, preferably at least twice that of the first heating element layer, and preferably having a smaller thickness than the first heating element. That is, heat generation necessary for thermal printing is chiefly effected in the second heating element layer close to the ink layer. Therefore, the energy efficiency for thermal printing can be improved, and the peak temperature of heat generation can be reduced. Also, the heat generated in the second heating element layer can be transmitted directly to the ink layer thereby heating the ink layer without being accompanied by appreciable diffusion and accomplishing printing with high resolving power.

Further, because the ink medium has the first heating element layer as the outermost layer in contact with a printing head, the contact resistance between the ink medium and the printing head can be minimized thereby reducing the surface damage on the ink medium which may caused by the contact with a printing head.

While the invention has been described in detail and with reference to specific examples thereof, it will be apparent to one skilled in the art that various changes and modifications can be made therein without departing from the spirit and scope thereof.

What is claimed is:

1. A thermal printing ink medium which electrically generates heat to transfer an ink thereof to a transfer material to form an image thereon, which comprises a first heating element layer having a volume resistivity of from $10^{-2}$ to $10^4$ Ωcm and a thickness of from 150 Å to 200 μm, a second heating element layer having a volume resistivity of from $10^{-1}$ to $10^{10}$ Ωcm and a thickness of from 500 Å to 200 μm in contact with said first heating element layer, said second heating element layer having a volume resistivity at least twice that of said first heating element layer and a smaller thickness than said first heating element, a conductive layer having a volume resistivity of not more than $10^{-2}$ Ωcm and a thickness of from 500 Å to 3 μm in contact with said second heating element layer, an ink layer provided on the side of said conductive layer opposite to said second heating element layer, and an adhesion-improving layer formed on the interface between said conductive layer and second heating element layer by interaction between said conductive layer and said second heating element layer.

2. A thermal printing ink medium as claimed in claim 1, wherein said adhesion-improving layer has a volume resistivity of from $10^{-1}$ to $10^{10}$ Ωcm.

3. A thermal printing ink medium as claimed in claim 1, wherein said adhesion-improving layer has a thickness of not more than 0.3 μm.

4. A thermal printing ink medium as claimed in claim 3, wherein said adhesion-improving layer has a thickness of not more than 0.05 μm.

5. A thermal printing ink medium as claimed in claim 1, wherein said conductive layer is a layer containing aluminum, and said adhesion-improving layer is a layer comprising aluminum oxide.

6. A thermal printing ink medium as claimed in claim 1, wherein said medium further comprises a protective layer for said conductive layer provided between the conductive layer and the ink layer, wherein said protective layer has a volume resistivity of not less than $10^8$ Ωcm, a critical surface tension of not more than 36 dyne/cm and a thickness of from 0.1 to 4.9 μm.

7. A thermal printing ink medium as claimed in claim 1, wherein said medium further comprises an anisotropic conductive layer provided on a surface of said first heating element layer opposite to the surface in contact with the second heating element layer.

8. A thermal printing medium as claimed in claim 1, wherein said first heating element layer comprises a heat-resistant binder resin having dispersed or dissolved therein a conductive material.

9. A thermal printing ink medium as claimed in claim 8, wherein the binder resin is selected from the group consisting of polyimide resins, aromatic polyamide resins, polysulfone resins, polyimide-amide resins, polyester-imide resins, polyphenylene oxide resins, poly-p-xylylene resins, polybenzimidazole resins, and derivatives thereof.

10. A thermal printing ink medium as claimed in claim 8, wherein the conductive material is selected from the group consisting of carbon particles, metal powders, conductive ceramic powders, and ion conducting materials.

11. A thermal printing ink medium as claimed in claim 1, wherein said second heating element layer is a single layer of ceramic material, a mixed layer of ceramic materials, a mixed layer of heat-resistant resins, or a mixed layer of ceramic and metallic materials.

12. A thermal printing ink medium as claimed in claim 11, wherein said second heating element layer additionally comprises a conductive filler or an insulating filler.

13. A thermal printing ink medium as claimed in claim 1, wherein said second heating element layer comprises an insulating material.

14. A thermal printing ink medium as claimed in claim 13, wherein the insulating material is a metal oxide.

15. A thermal printing ink medium as claimed in claim 13, wherein the insulating material is selected from the group consisting of AlN, $SiN_4$, $Al_2O_3$, MgO, $VO_2$, $SiO_2$, $ZrO_2$, $Bi_2O_3$, $TiO_2$, $MoO_2$, $WO_2$, $NbO_2$, $BO_6$, and $ReO_3$, and polyimide resins, aromatic polyamide resins, polysulfone resins, polyimide-amide resins, polyester-imide resins, polyphenylene oxide resin, poly-p-xylylene resins, polybenzimidazole resins, and derivatives thereof.

16. A thermal printing ink medium as claimed in claim 1, wherein said heating element layer is a composite layer of ceramic materials or a composite layer of heat resistant resin.

* * * * *